S. H. TINSMAN.
PLOW.
APPLICATION FILED NOV. 15, 1909.
1,016,378.
Patented Feb. 6, 1912.
2 SHEETS—SHEET 1.
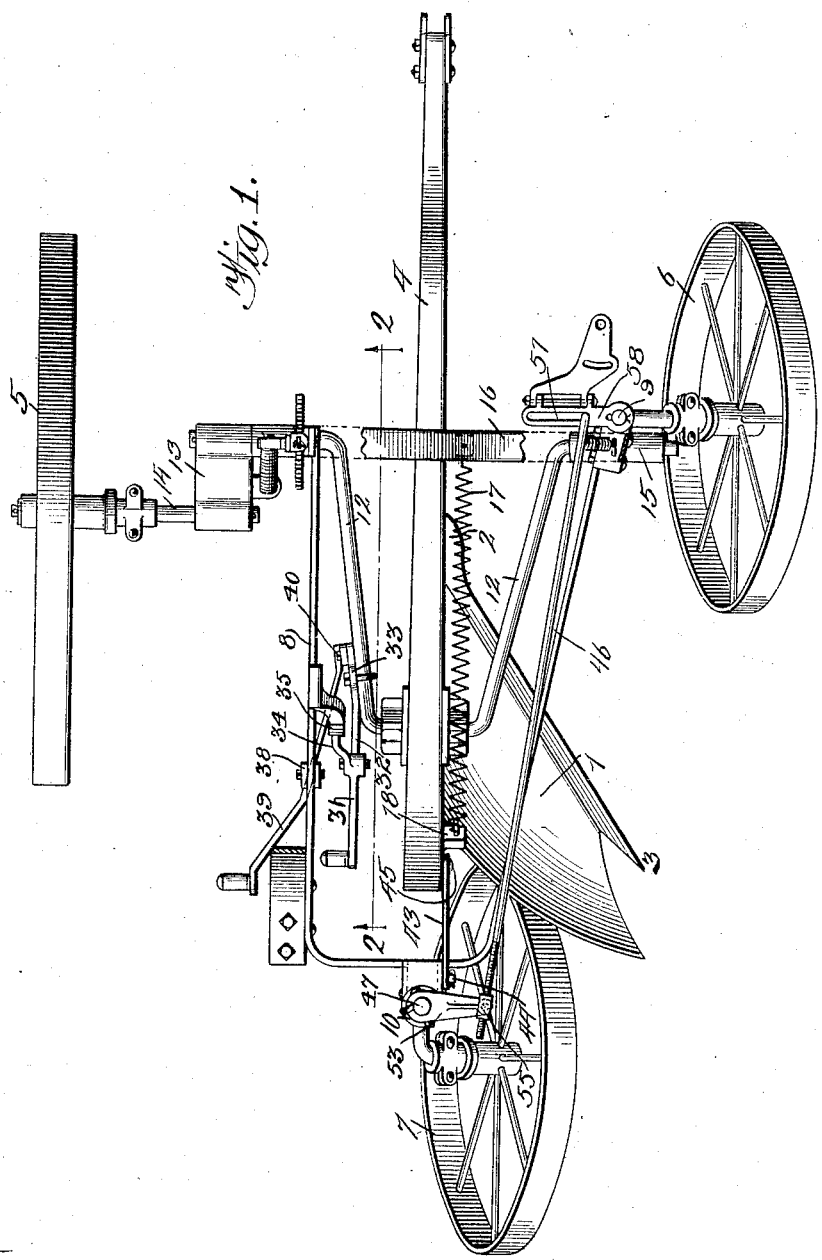

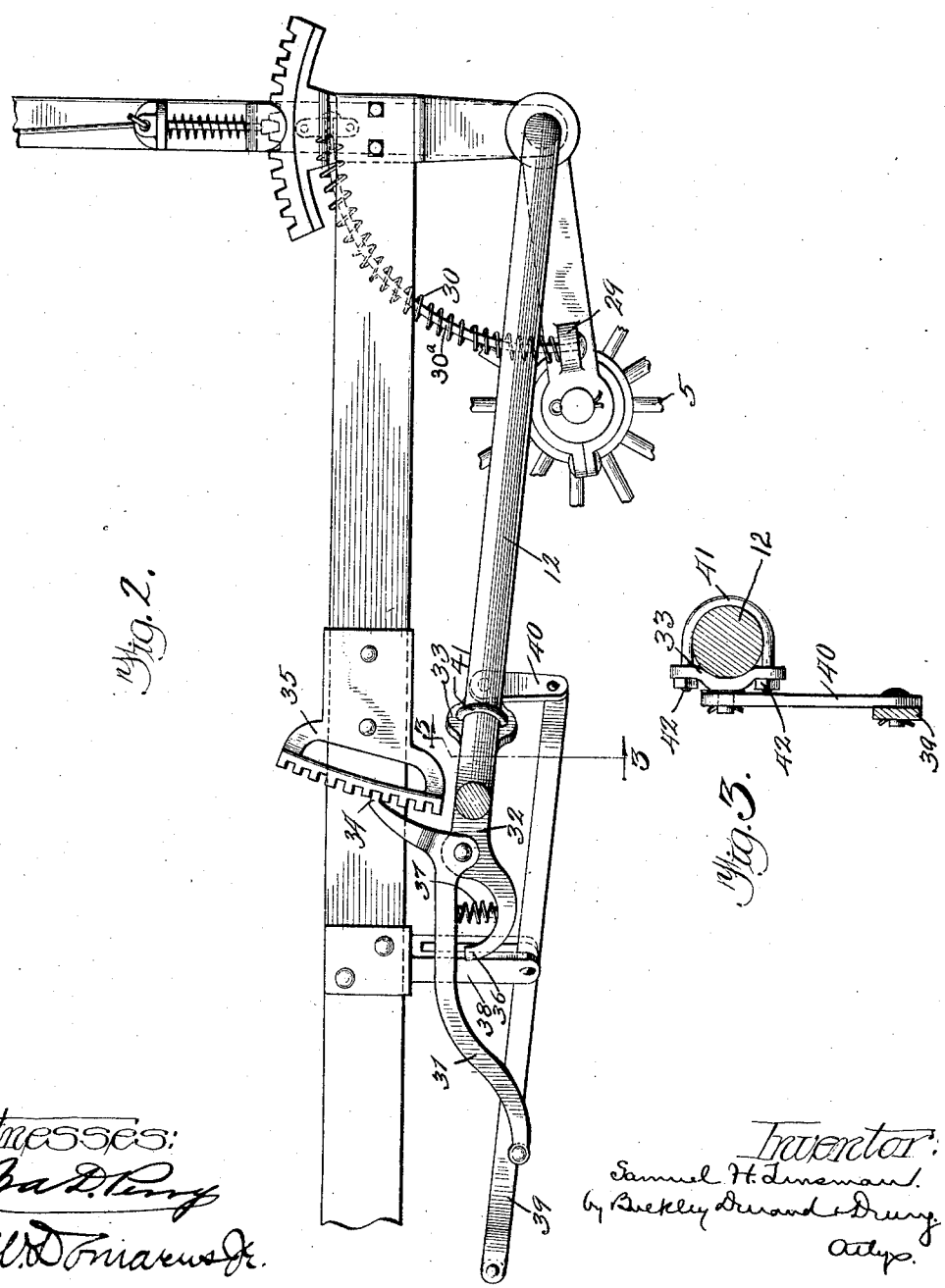

UNITED STATES PATENT OFFICE.

SAMUEL H. TINSMAN, OF ST. JOSEPH, MISSOURI.

PLOW.

1,016,378.  Specification of Letters Patent.  Patented Feb. 6, 1912.

Application filed November 15, 1909. Serial No. 528,194.

*To all whom it may concern:*

Be it known that I, SAMUEL H. TINSMAN, a citizen of the United States of America, and resident of St. Joseph, county of Buchanan, State of Missouri, have invented a certain new and useful Improvement in Plows, of which the following is a specification.

My invention relates to improvements in plows of the wheeled or sulky type, and has for its object the production of improved foot-lifting and depressing mechanism.

A further object is the provision of means whereby the plow can be positively locked in any desired position.

By the use of a single rearwardly extending bail axle I effect a great simplicity of construction and at the same time produce an implement that is easily operated.

These and such other objects as may hereinafter appear are attained by my invention, embodiments of which are illustrated in the accompanying drawings, in which—

Figure 1 is a plan view of the same. Fig. 2 is an enlarged detail showing my improved foot-levers. Fig. 3 is a sectional view on line 3—3 of Fig. 2, looking in the direction indicated by arrows.

Like numerals of reference indicate like parts in the several figures of the drawings.

Referring now by numeral to the accompanying drawings—1 represents the plow; 2 the point, 3 the heel; 4 the plow beam; 5 the land-side wheel, and 7 the caster wheel. The frame 8 is mounted on the wheels through the medium of front and rear posts 9 and 10, and the bail hanger or supporting casting 11 is mounted on the land-side end of the frame 8 and supports the rearwardly extending bail-shaped axle 12. The land side of the axle is journaled in one end of the crank bar 13, the spindle 14 of the land-side wheel being rigid in the other end of the crank bar 13.

The furrow side of the bail axle 12 is loosely journaled in the supporting boss 15 formed integral with the front post 9. A bar 16 unites the two sides of the frame, on the furrow side of which is secured one end of the spring 17, the other end being secured to the plow beam at 18. A driver's seat 19 is mounted on a supporting spring 20 secured to the rear of the frame 8. It will be noted that the plow beam is mounted on the bail axle 12 well toward the rear, so that the plow and beam are nearly balanced thereon.

Referring now more particularly to Fig. 2: The depressing foot-lever 31 is pivotally mounted on an arm 32 secured to the bail axle 12 by means of the casting 33. The upper arm of the lever 31 terminates in a locking dog 34 adapted to engage the teeth of a rack 35 secured to the frame 8, while the arm 32 extends downwardly under the lever 31, forming a stop 36. A spring 37 is mounted between the lever 31 and the stop 36, normally holding the dog 34 in engagement with the teeth of the rack 35. A hanger 38 is secured to the frame 8 between the depending ears of which is pivotally mounted the raising foot-lever 39. The inner end of the lever 39 is pivotally secured to the lower end of a short connecting link 40 connected at its upper end to the casting 33 rigid on the bail 12.

As shown in Fig. 3, the casting 33 partly encircles the bail and may be secured to the bail by means of a U-bolt 41 passing around the bail and held rigidly in place by means of nuts 42.

When it is desired to throw the plow into the ground, the operator presses down with his foot on the lever 31. This disengages the dog from the teeth of the rack 35. When the lever strikes the stop 36, it becomes practically a continuation of the arm 32 rigidly mounted on the bail axle. Continued pressure on the foot-lever 31 then forces the plow into the ground to any desired depth; when the pressure of the foot is removed, the dog 34 is thrown into engagement with the teeth of the rack, locking the plow in the ground. In order to withdraw the plow from the ground, the dog is again thrown out of engagement with the rack and the operator presses downwardly on the lever 39. This being pivoted in the middle, raises the inner end, which is connected with the bail axle, bringing the plow out of the ground, the spring 17 assisting in raising the plow. The dog 34 passes upwardly over the rack as the plow is raised, and drops into engagement with the teeth when the highest point is reached, or when the foot is released.

A connecting strap or swinging link 43 is pivotally secured to the rear of the frame 8 at 44, and to the plow beam at 45. This swinging link connection serves as a second bail and extending rearwardly in the same general direction as the bail axle gives great strength and rigidity to the implement, as well as simplicity of construction. The angle of direction of this link, when the plow is in the ground, is such as to prevent any upward movement of the plow when meeting any obstruction and any downward strain is resolved into a direct pull on the link. As the greater strain is on the furrow side, I have anticipated this by utilizing the front post, bolting the frame thereto as shown at 44, and journaling the bail axle thereon, as shown at 45, while the furrow wheel axle is turned upwardly and mounted within the post. This construction further strengthens and simplifies the implement.

I claim:

1. The combination of an implement, a frame, a rack mounted on said frame, a bail crank axle upon which said implement is mounted, foot-operated means for lowering said implement, comprising an arm mounted fixedly on the swinging bail portion of said crank axle, a rack engaging lever pivotally mounted on said arm, said arm adapted to be operated to lower said implement.

2. The combination of an implement, a frame, a rack rigid therewith, a bail crank axle upon which said implement is mounted, an arm mounted fixedly on the swinging bail portion of said crank axle, a foot-operated depressing lever pivotally mounted on said arm and adapted to engage said rack when the implement is in raised position, and also adapted to engage the end of said arm when the lever is depressed.

Signed by me at Chicago, Illinois, this 1st day of November 1909.

SAMUEL H. TINSMAN.

Witnesses:
E. H. CLEGG,
WM. B. DURMON.

Copies of this patent may be obtained for five cents each, by addressing the "Commissioner of Patents, Washington, D. C."